US008186700B2

(12) United States Patent
Li et al.

(10) Patent No.: US 8,186,700 B2
(45) Date of Patent: May 29, 2012

(54) WHEELCHAIR, WHEELCHAIR APPARATUS AND WHEELCHAIR CARE SERVICE NETWORK SYSTEM

(75) Inventors: Jeng Han Li, Pingtung County (TW); Yu Hsien Chiu, Kaohsiung County (TW); Yu Wei Hung, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 414 days.

(21) Appl. No.: 12/399,459

(22) Filed: Mar. 6, 2009

(65) Prior Publication Data

US 2010/0066056 A1 Mar. 18, 2010

(30) Foreign Application Priority Data

Sep. 17, 2008 (TW) ............................... 97135566 A

(51) Int. Cl.
*B62M 1/14* (2006.01)

(52) U.S. Cl. ................................. 280/250.1; 280/304.1

(58) Field of Classification Search ............... 280/304.1, 280/250.1

See application file for complete search history.

(56) References Cited

U.S. PATENT DOCUMENTS 3,903,513 A 9/1975 Green et al.
5,203,433 A * 4/1993 Dugas ............................ 188/2 F
5,667,236 A * 9/1997 Murphy ..................... 280/304.1
5,894,912 A * 4/1999 Dobben ......................... 188/2 F
5,984,334 A * 11/1999 Dugas ........................ 280/250.1
6,030,351 A 2/2000 Schmidt et al.
6,287,153 B1 9/2001 Asaoka et al.
6,371,503 B2 * 4/2002 Ritchie et al. .............. 280/304.1
6,688,437 B2 * 2/2004 Usherovich .................... 188/2 F
6,739,610 B2 5/2004 Connors et al.
6,788,206 B1 9/2004 Edwards
6,851,522 B2 2/2005 Wren
6,863,293 B2 3/2005 Kimura et al.
7,144,025 B2 * 12/2006 Wakita et al. .............. 280/250.1
7,311,675 B2 12/2007 Peifer et al.
7,434,824 B2 * 10/2008 Connors et al. ............ 280/304.1
2003/0146056 A1 * 8/2003 Wren ............................ 188/2 F
2006/0293613 A1 12/2006 Fatehi et al.

* cited by examiner

*Primary Examiner* — Paul N Dickson
*Assistant Examiner* — Marlon Arce
(74) *Attorney, Agent, or Firm* — WPAT, P.C.; Anthony King

(57) ABSTRACT

A wheelchair includes a seat, one or more wheels and a seat weight sensing mechanism. The wheel includes a brake for stopping the wheel. The seat weight sensing mechanism is placed below the seat and is connected to the brake. When the seat is loaded by a weight more than a predetermined value, the seat weight sensing mechanism releases the brake to free the wheel. When the seat is not loaded by a weight more than a predetermined value, the brake stops the wheel.

7 Claims, 11 Drawing Sheets

WHEELCHAIR, WHEELCHAIR APPARATUS AND WHEELCHAIR CARE SERVICE NETWORK SYSTEM

BACKGROUND OF THE INVENTION (A) Field of the Invention

The present invention is related to a wheelchair, a wheelchair apparatus and a wheelchair care service network system, and more specifically, to a wheelchair, a wheelchair apparatus and a wheelchair care service network system having automatic brake and user posture detection functions.

(B) Description of the Related Art

Wheelchairs are indispensable items for disabled people, and most wheelchairs feature only basic functions and are propelled manually. Manual wheelchairs can be propelled carelessly or accidentally, and therefore are not stable and safe apparatuses. Many disabled people cannot operate or control their wheelchairs with sufficient caution, and as a result accidents frequently occur.

In clinical use, accidents occur most frequently when the user stands up or sits down. The wheelchair may suddenly slip, causing the user to trip. In addition, other accidents frequently occur when the user stands behind the wheelchair and pushes the wheelchair to move forward. The user may walk unsteadily and fall if the wheelchair slips abruptly. In addition to user falls, other problems can occur, including bedsores due to local compression or body deformation due to incorrect posture, both of which are common symptoms suffered by those who sit in their wheelchairs for a long time.

In current clinical settings, prevention of such mishaps and ailments caused by wheelchairs is maintained as part of the overall health care management system. However, with the aging of the population and increasing health care costs, more care providers must take care of many patients. As a result, less attention is given to each patient. Therefore, there is a need to reduce the tasks of the health care worker by use of technology to perform tasks such as monitoring of body postures and physiology states or the predictions of high risk conditions. Such tasks can be handled by a well prepared detection system. The system can warn the wheelchair users and care providers.

SUMMARY OF THE INVENTION

The present invention provides a wheelchair having an automatic brake, a wheelchair apparatus of user posture detection function and a wheelchair care service network system, which can be applied to clinics or families.

In accordance with an embodiment of the present invention, a wheelchair includes a seat, at least one wheel and a seat weight sensing mechanism. The wheel includes a brake to stop the wheel. The seat weight sensing mechanism is disposed below the seat and is connected to the brake. The seat weight sensing mechanism releases the brake to unlock the wheel when the seat is loaded over a predetermined weight, and the brake stops the wheel when the seat is not loaded over a predetermined weight.

In accordance with an embodiment of the present invention, a wheelchair apparatus includes a wheelchair and a data processing unit. The wheelchair includes a seat, a seat back and an armrest, and at least one of the seat, the seat back and the armrest is provided with a plurality of sensors. The data processing unit is configured to process data obtained by the sensors to analyze a user's posture and action.

In accordance with an embodiment of the present invention, a wheelchair care service network system includes a wheelchair, a server and at least one user interface. The wheelchair includes a seat, a seat back and an armrest, in which at least one of the seat, the seat back and the armrest is provided with a plurality of sensors. The wheelchair further includes a data processing unit for processing data obtained by the sensors to analyze a user's posture or action. The server is configured to store and process the sensed data from the wheelchair. The user interface is connected to the server and allows a care provider to access the data in the server.

DETAILED DESCRIPTION OF THE INVENTION

The present invention will be explained with the appended drawings to clearly disclose the technical characteristics of the present invention. However, the embodiments are exemplified only, and do not limit the scope of the present invention.

Figure 1:
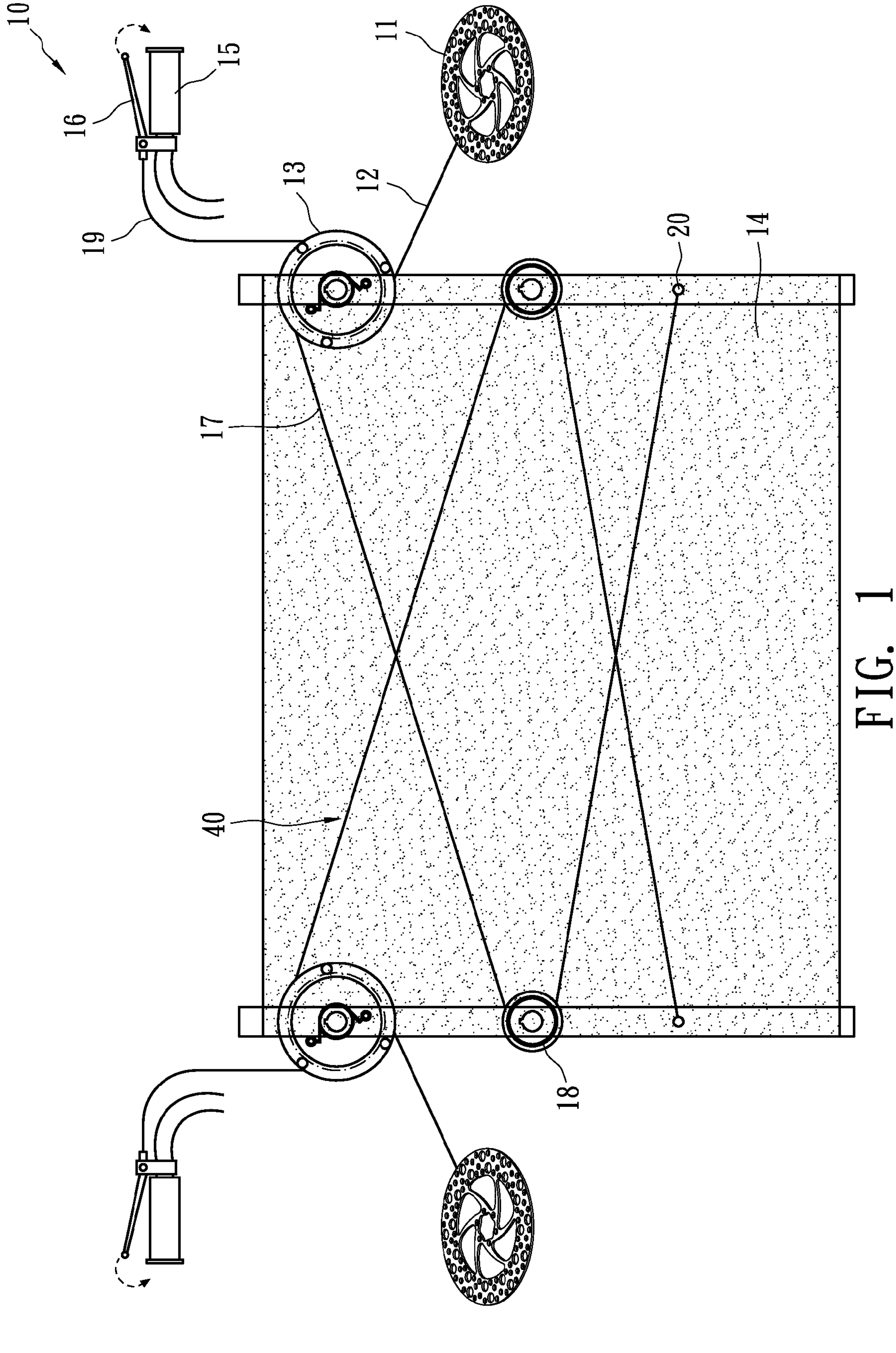
FIGS. 1 to 4 show a wheelchair in accordance with an embodiment of the present invention.
Figure 2:
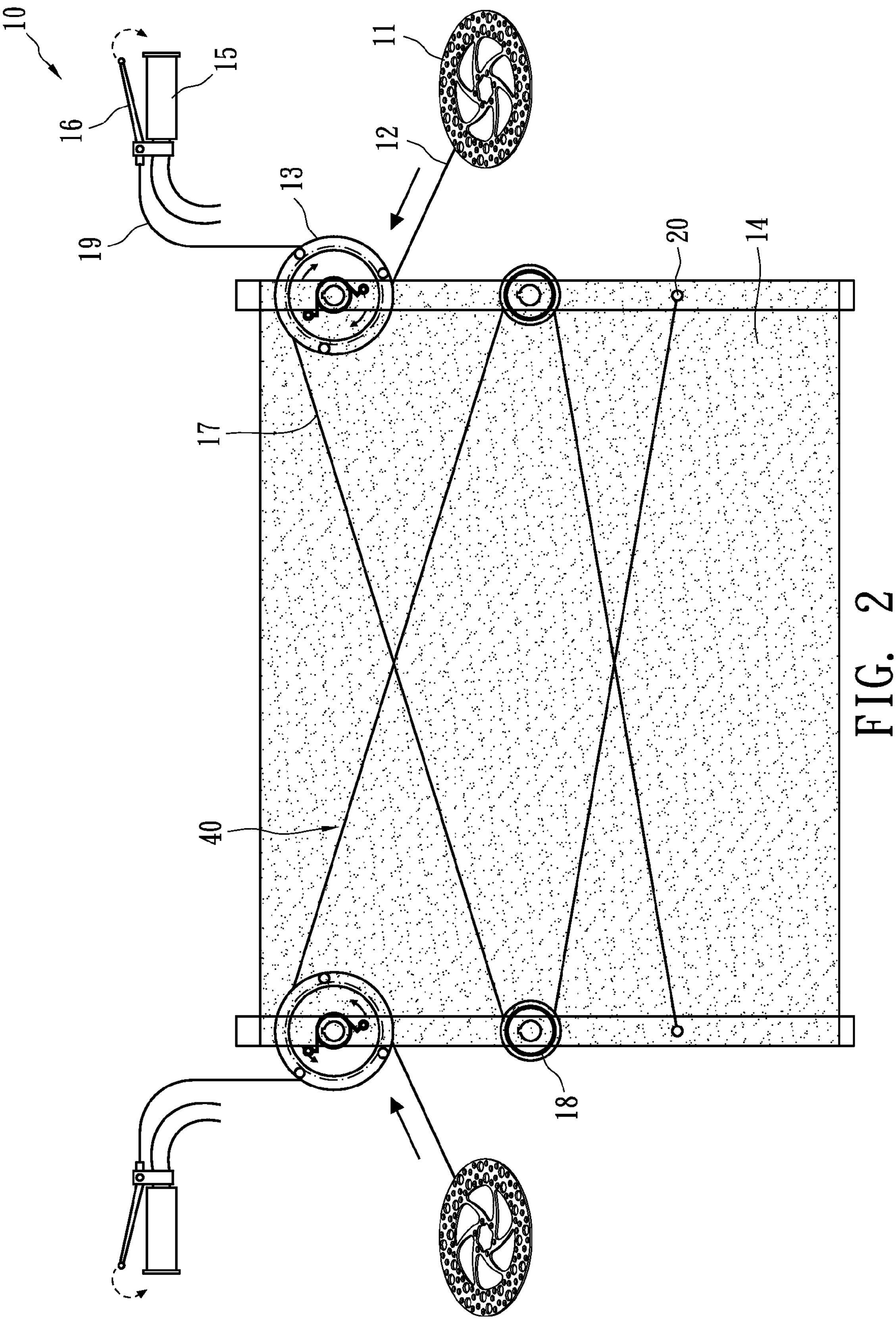
Figure 3:
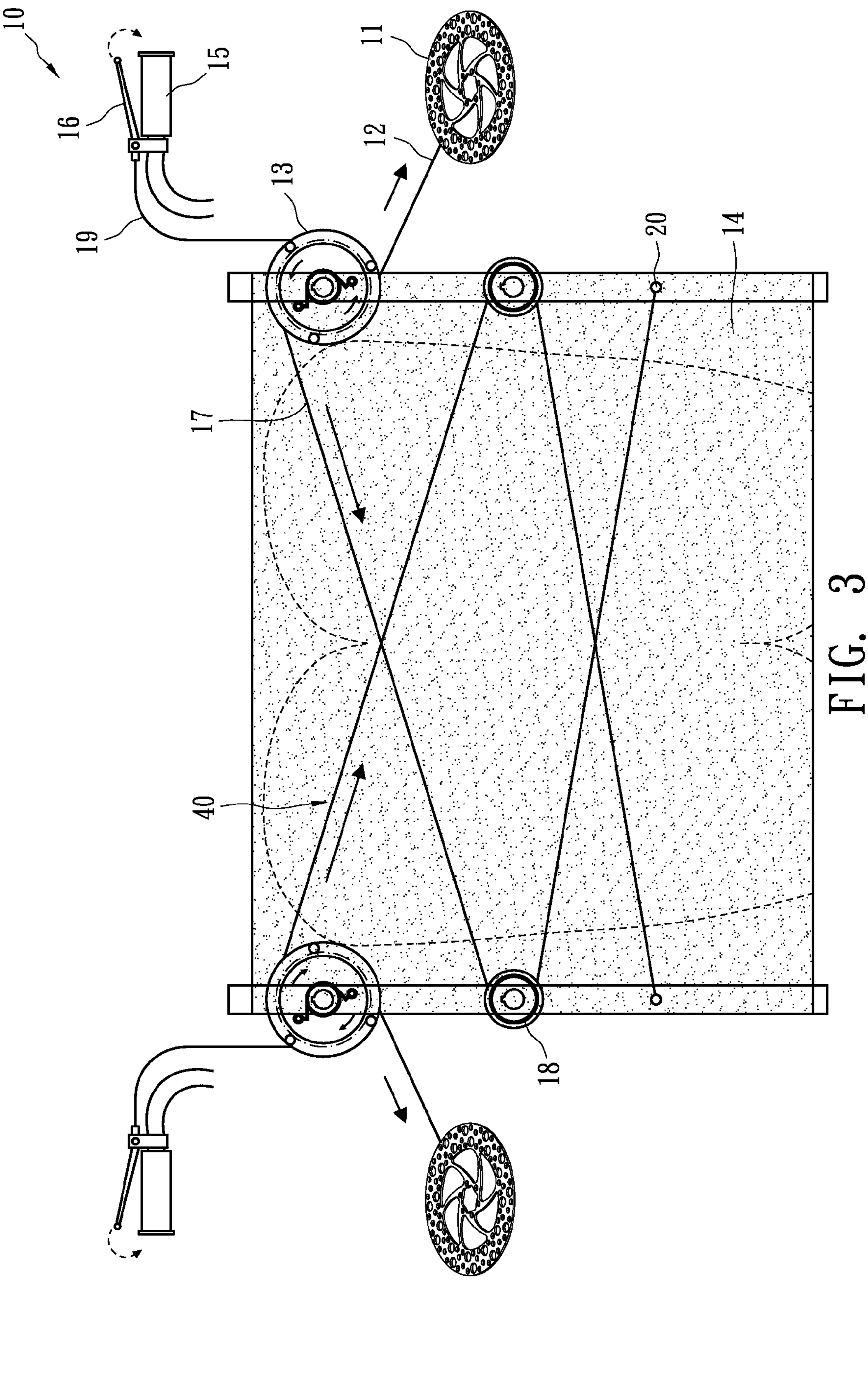
Figure 4:
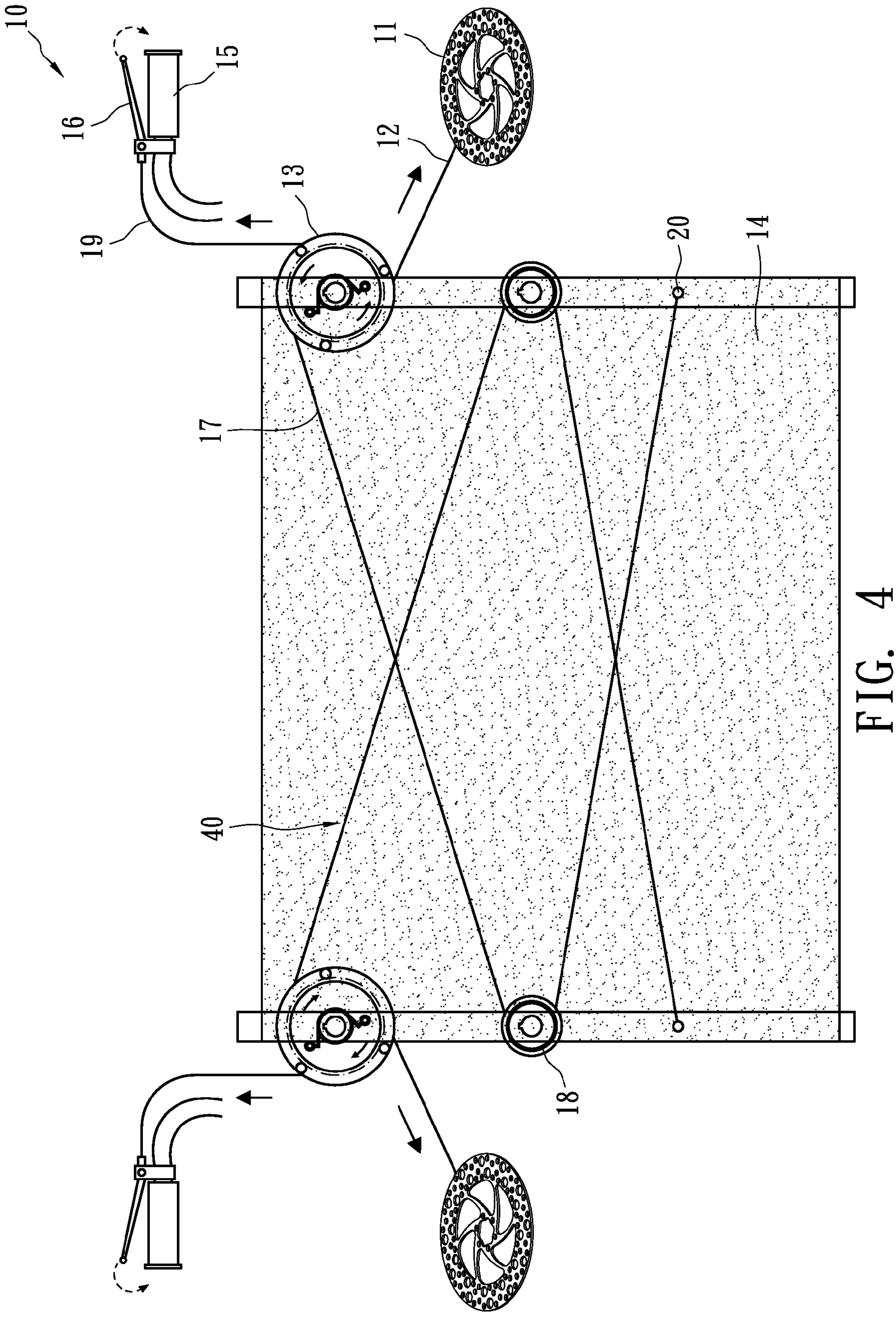

A foldable wheelchair is a dangerous moveable apparatus when its manual brake is not locked. Many wheelchair accidents are caused by the unpredicted movement of the wheelchairs. FIG. 1 shows a wheelchair 10 with an automatic brake of an embodiment of the present invention. Each wheel 11 of the wheelchair 10 is provided with a brake such as a disc brake, and a tugging cable 12 is connected to a tugging member 13 such as a tugging roller disposed at a side of a seat 14. The tugging member 13 has a coil spring to pull the cable 12, and as a result the disc brake is locked. Accordingly, the wheelchair 10 cannot move unless the brake is released. When nobody sits in the wheelchair 10, the coil spring of the tugging member 13 locks the brake of the wheel 11 as shown in FIG. 2. In this embodiment, pulleys 18 are placed at the middle portions of the right and left sides of the seat 14. A cable 17 is connected to the tugging member 13, winds around the pulley 18 and extends to be connected to a secure position 20 at another side of the seat 14. The cables 17 form an interlaced seat weight sensing mechanism 40 to support and sense a wheelchair user. When the user is seated correctly on the seat 14, the seat 14 is deformed and presses the mechanism of the cables 17. As a result, tensions are generated in the cables 12 to counteract the elastic force of the coil spring of the tugging member 13, so as to release the brake as shown in FIG. 3. In other words, when the weight on the seat 14 does not exceed a predetermined weight (e.g., the user is not well seated), the brake stops the wheels 11. When the weight on the seat 14 exceeds a predetermined weight (e.g., the user is well seated), the seat weight detection mechanism 40 tugs and releases the brake of the wheels 11. The armrests 15 placed at the rear of the wheelchair 10 are provided with manual brake release devices 16. When the manual brake release device 16 is activated, the tension in the cable 19 will tug the tugging member 13, and then the cable 12 is tugged to release the brake as shown in FIG. 4.

Figure 5:
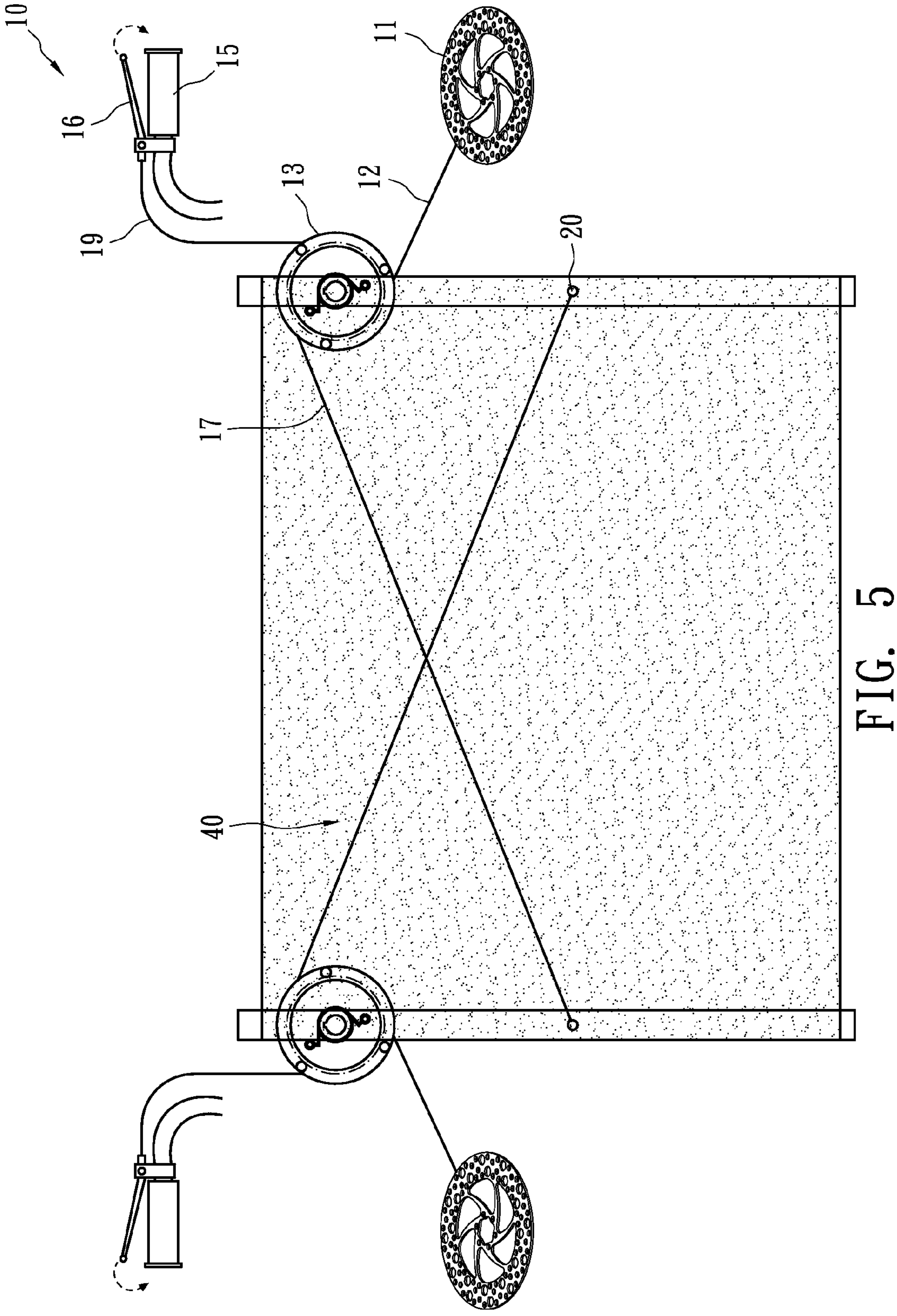
FIGS. 5 to 7 show wheelchairs in accordance with other embodiments of the present invention.

In FIG. 5, the arrangement of the cables 17 may have some variations. The tugging members 13 are placed at two sides of the seat 14. Each of the cables 17 is connected to a secure point 20 at another side of the seat 14 to form an interlaced seat weight sensing mechanism 40 to support and sense the user. In this embodiment, the pulleys are not needed, and thus the design is simpler. However, the designer may need to consider the support strength and comfort problem.

Figure 6:
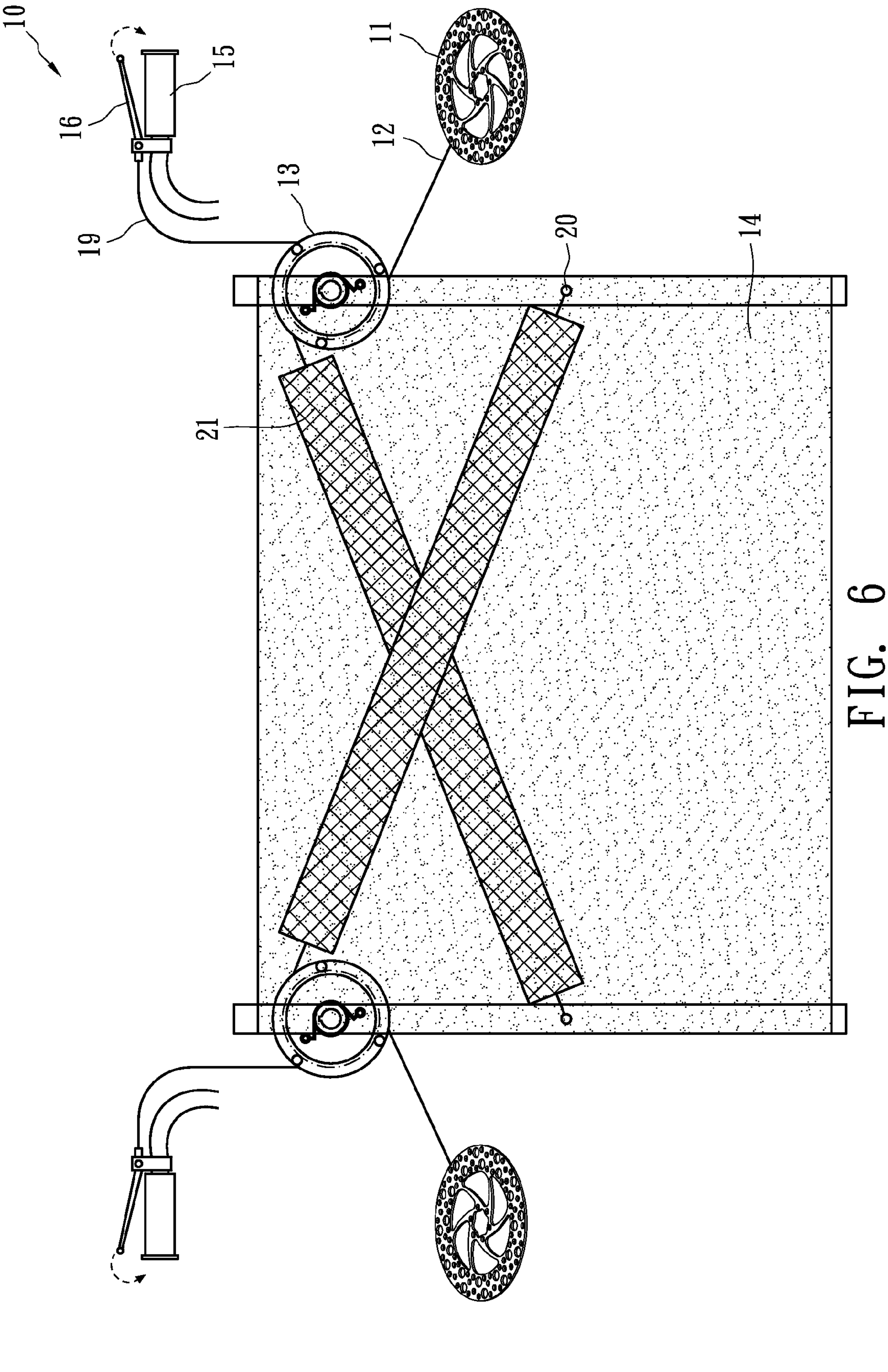

In FIG. 6, wide straps 21 can be used instead of cables to increase user comfort. If the elasticity of the straps 21 is insufficient, the straps must have enough rigidity to prevent the tugging members 13 from being forced out of control by the straps 21 because the influence of the weight is fully absorbed by the deformation of the straps 21.

Figure 7:
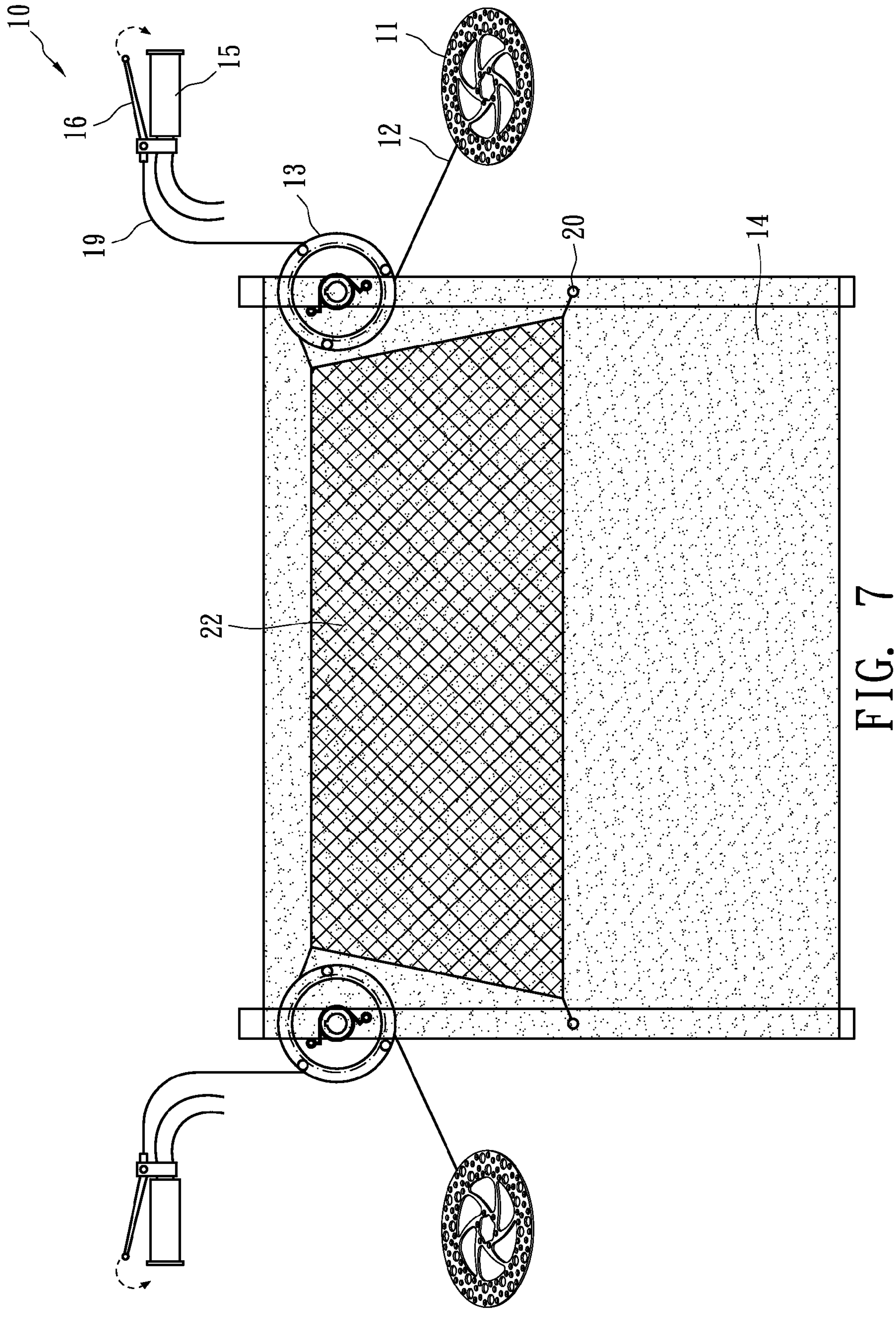

In FIG. 7, a netlike fabric 22 or leather may be used instead of the cables or the straps so as to further increase the user's comfort. The deformation of the fabric or leather must be minimal in order to retain tight control of the tugging members 13.

Accordingly, the seat weight sensing mechanism of the cables, straps, netlike fabric or leather can automatically verify whether the user is seated in the wheelchair. When the user is well seated, the seat weight sensing mechanism tugs and releases the brake of the wheels. Otherwise, the wheels are locked.

Figure 8:
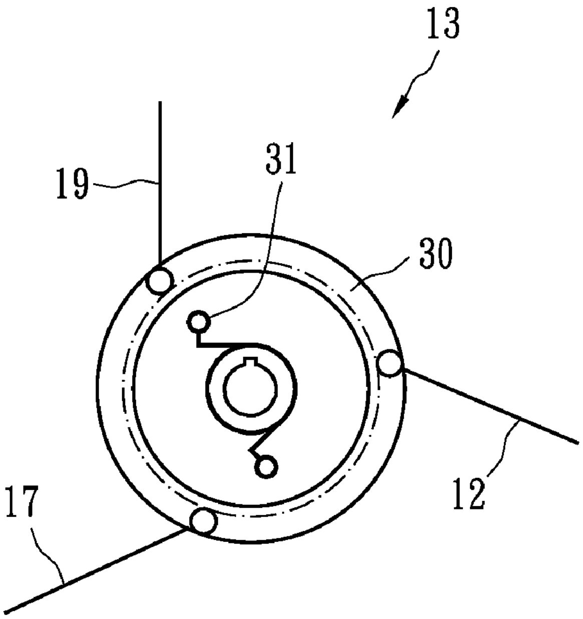
FIGS. 8 and 9 show tug members of an automatic brake of a wheelchair in accordance with embodiments of the present invention.
Figure 9:
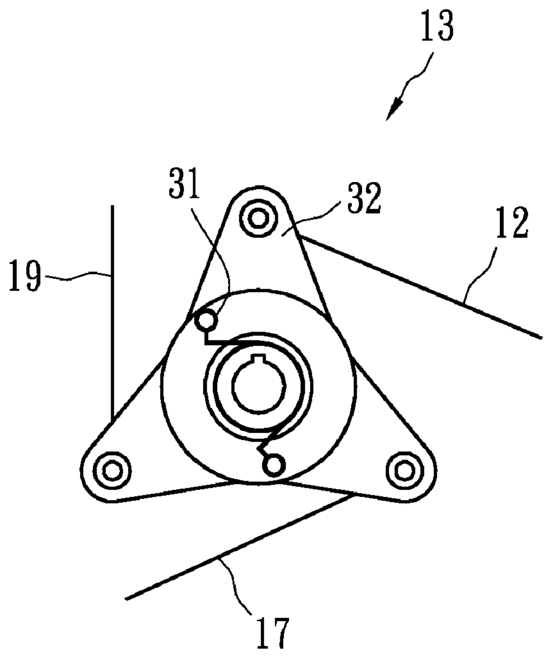

FIG. 8 shows the details of the tugging member 13 in accordance with an embodiment of the present invention. A pulley 30 of a roller type is employed to generate and release the tensions in the cables 12, 17 and 19. An end of each of the cables 12, 17 and 19 is connected to a secure point of the pulley 30, and accordingly when tension or compression in the cable 12, 17 or 19 is changed, the other two cables will be tugged to lock or release the brake. The center of the pulley 30 has a coil spring 31, and the elastic force of the coil spring 31 brakes the wheels 11 so that the wheelchair 10 is not moveable when nobody sits in the wheelchair 10. When tension is generated in the cable 17 or the cable 19 is tugged by the armrest brake release device 16, the elastic force of the coil spring 31 is counteracted to release the wheels 11, and therefore the wheelchair 10 becomes moveable. Moreover, the tugging member 13 may use the concentric torque member 32 shown in FIG. 9. The concentric torque member 32 includes a coil spring 31 also to achieve equivalent efficacy.

The wheelchair automatic brake apparatus can ensure the wheelchair is braked whenever the user is not well seated, so as to reduce the risks of tripping while the user is getting into or out of the wheelchair. The wheelchair automatic brake apparatus can also be foldable. Many people use the wheelchair as a stepping assistant; they stand behind the wheelchair and are supported by the armrests, and step forward by pushing the wheelchair. However, the physical conditions of the users vary, and their abilities to maintain control while pushing the wheelchair are different. Many accidents such as the user's tripping are caused by an unexpected movement of the wheelchair when the user steps forward while pushing the wheelchair. According to this invention, the brake release device is placed at the armrest, and the user can press the brake release device to release the wheelchair when the user steps forward while pushing the wheelchair. If the wheelchair is out of the user's control and slips forward, the user no longer holds the brake release device and therefore the wheelchair will be braked automatically. Therefore, user tripping accident due to unexpected movement of the wheelchair can be avoided. Moreover, the care provider can press the brake release device on the armrest to move the wheelchair when needed.

Figure 10:
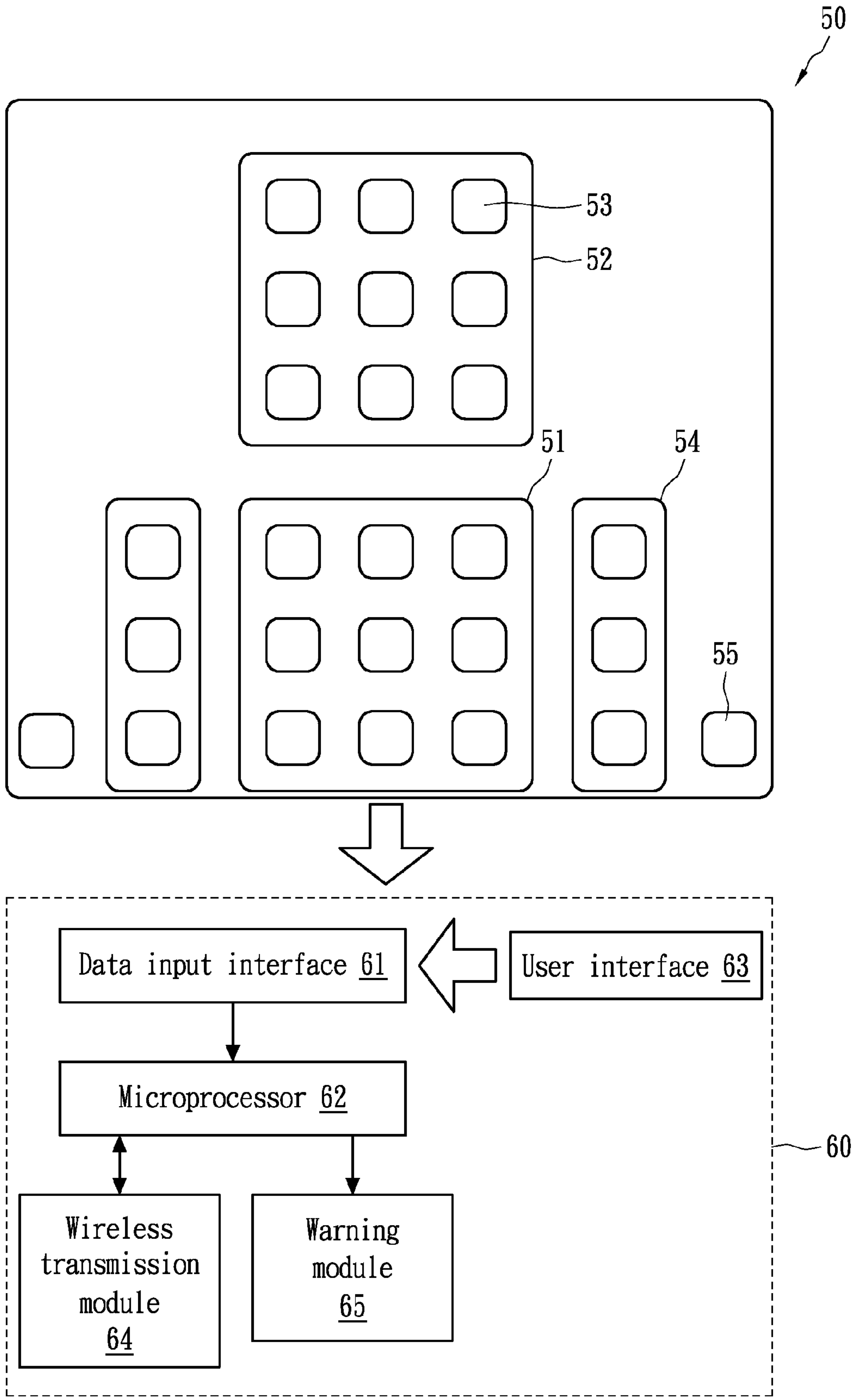
FIG. 10 shows a wheelchair apparatus in accordance with the present invention.

FIG. 10 shows an apparatus 50 of the user's posture detection and warning functions. The seat 51 and the seat back 52 are provided with sensors 53. The sensors 53 are evenly distributed or locally concentrated in an array or non-array manner, and may be of pressure type, switch type or their combination. A corresponding data processing unit 60 may include a data input interface 61. If pressure sensors are used, the data processing unit 60 has to have an analog-to-digital conversion interface to convert the analog sensed voltages to digital signals for being processed by the microprocessor 62. If switch sensors are used, digital interfaces read the voltages of the switch sensors, and the data can be processed in the microprocessor 62 directly. The sensors 53 on the armrests 54 may be pressure sensors or switch sensors to verify whether the user presses the armrests 54 and wishes to stand up or sit down. The manual brake sensor 55 is a switch sensor to verify that the manual brake of the wheelchair is locked. By using the information obtained from the seat 51, the seat back 52, the armrests 54 and the manual brake sensor 55, the user's intended action and posture can be estimated. A user interface 63 is used for inputting the setting data to the data input interface 61. For example, the data processing unit 60 is set to receive digital or analog data. Moreover, the data processing unit 60 may further include a wireless transmission module 64 and a warning module 65. The data obtained by the sensors 53 is processed by the microprocessor 62 to be converted into the information of the user's postures and actions. The information can be stored locally or transmitted to a remote server through a wireless transmission module 64 for further storage and analysis. If the user's postures and actions have high risk of accidents, the warning module 65 warns the user and the care provider by sound, light or vibration, and the wireless transmission module 64 sends warning messages to a remote server and a care worker's portable device for further storage and processing. According to current wireless technology, a wireless transmission module 64 may be a mobile phone.

Figure 11:
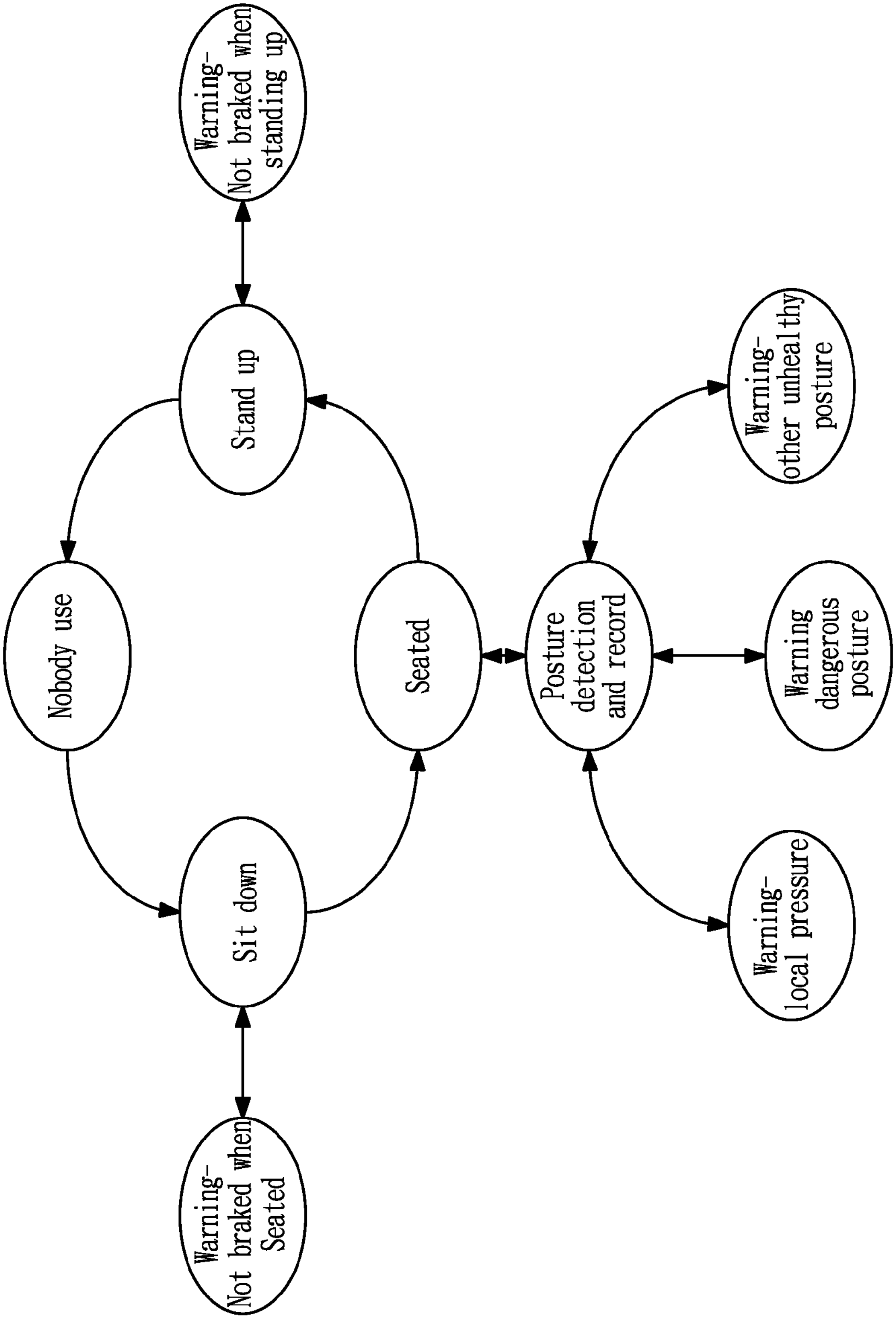
FIG. 11 shows a function flowchart of a wheelchair apparatus in accordance with the present invention.

FIG. 11 shows a function flow of the data processing unit 60. The situations of "non-brake when the user sits down" and "non-brake when the user stands up" are dangerous actions. Many wheelchair users such as aged people cannot control the wheelchair and react effectively. Therefore, if the wheelchair is not braked when a user stands up or sits down, the user may fall down due to an unexpected rush of the wheelchair. According to the variation of the pressures on the seat 51, the seat back 53 or the armrest 54 or the contours of the buttocks and the back thereon, the user's intention of whether the user is going to stand up or sit down can be estimated. If the user intends to stand up or sit down, the brake status is checked to ensure the brakes at both sides are locked. If the wheelchair is not braked, the warning module 65 of the data processing unit 60 will generate a warning by sound, light and vibration to remind the user to lock the brakes, and at the same time the wireless transmission module 64 sends a warning to the care provider. Accordingly, the user's tripping due to an unexpected movement of the wheelchair can be avoided. Table 1 shows the sensed data and the corresponding postures in accordance with an embodiment.

TABLE 1

| User's status | Sensed data |
|---|---|
| Not using | No pressure on the seat, seat back and armrest |

TABLE 1-continued

| User's status | Sensed data |
|---|---|
| Going to sit down | The front of the armrest is pressed, and the front of the seat is pressed. |
| Seated | The rear of the seat is pressed, and the seat back is pressed. |
| Going to stand up | The seat back and the rear of the seat have no pressure, and the front of the armrests are pressed. |

Moreover, while the user is seated in the wheelchair, the data processing unit 60 monitors the pressure distribution of the seat 51 and the seat back 52 and the contours of the buttocks and the back to verify whether the user's posture incurs local pressure, dangerous posture or the like. If a dangerous posture is verified, the warning module 65 of the data processing unit 60 will generate a warning by sound, light or vibration to remind the user of the posture, and the user's posture data will be transmitted to a care provider by the wireless transmission module 64 and stored in a care service server for further analysis. Table 2 shows the sensed data and the corresponding unhealthy postures in accordance with an embodiment.

TABLE 2

| User's posture | Sensed data |
|---|---|
| Local pressure (e.g., lean right) | Large local pressure on the seat, and/or large local pressure on the seat back. |
| Dangerous posture (e.g., tripping) | Only the front of the seat is pressed, or only the front of the seat back is pressed. |
| Unhealthy posture (e.g., seated for extended time) | The pressure distribution of the seat, seat back and the armrest caused by unhealthy postures |

The above two devices constitute a wheelchair apparatus of automatic brake and user posture detection and warning functions, so as to prevent an unexpected rush of the wheelchair by active automatic braking when the user is not well seated, and warn the user of the abnormal behaviors or inform the care provider of the same. Accordingly, the active and passive safety mechanisms can effectively reduce the likelihood of accidents. If one of the two independent mechanisms does not work, the other mechanism still can ensure safety. For example, if the posture detection and warning apparatus does not work, the automatic brake can effectively prevent the user from falling. Conversely, if the automatic brake does not work, the posture detection and warning apparatus can warn the user of unhealthy postures and the abnormal behaviors by sound, light and vibration to avoid dangers.

Figure 12:
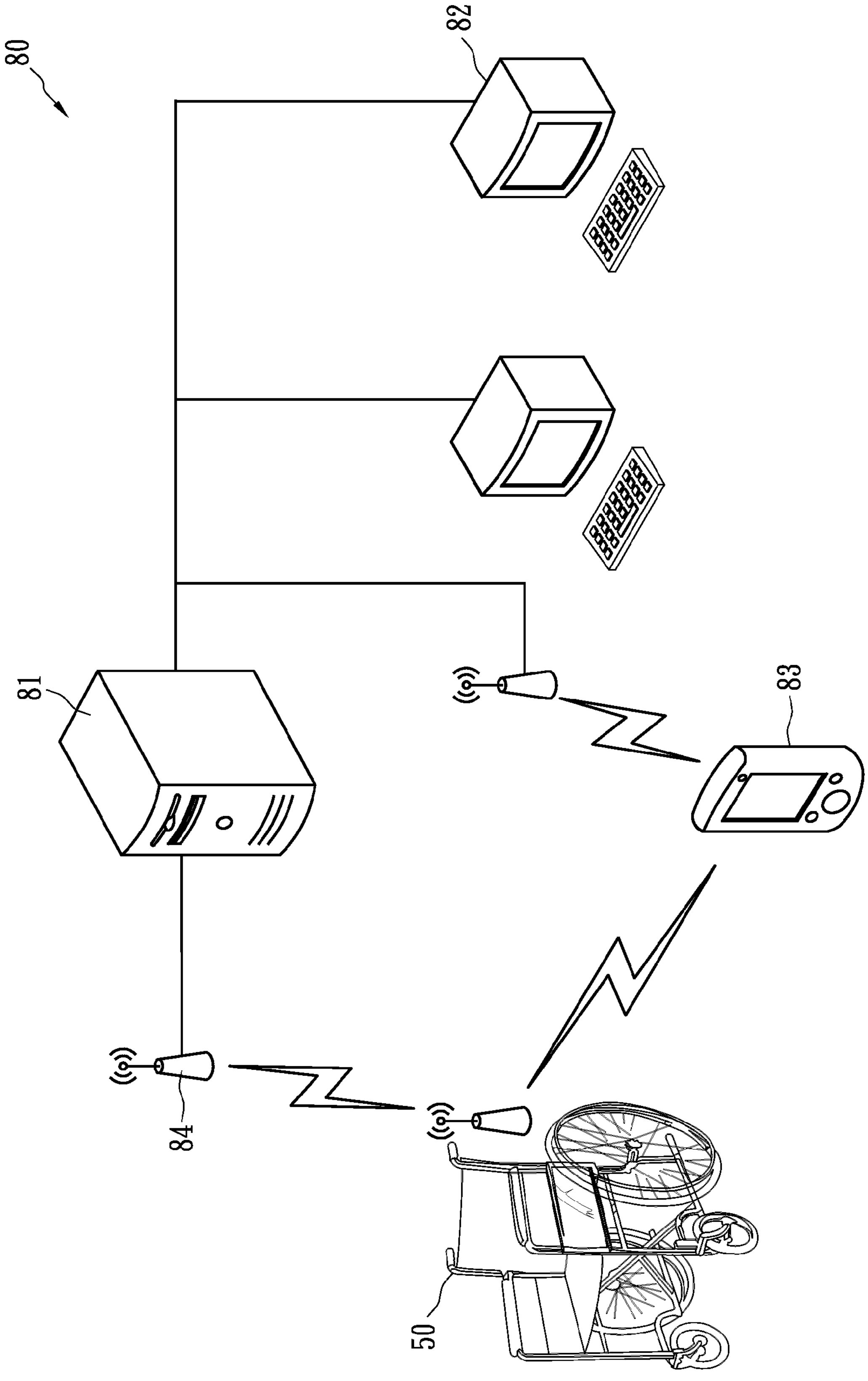
FIG. 12 shows a wheelchair care service network system in accordance with an embodiment of the present invention.

FIG. 12 shows a wheelchair care service network system 80 including the above-mentioned apparatus 50, a wireless access point 84, a server 81, a user interface 82 and a portable device 83. The wheelchair 50 sends the user's posture and a warning of dangerous operation to the wireless access point 84 and the portable device 83 of the care provider by wireless transmission. The wireless access point 84 transmits the data to the server 81 by the network for further data processing. The seated time, the user's posture and the warning message are analyzed in the data processing and the analyzed result is shown by tables or figures, so that the care worker can improve the service and enhance related safety education to prevent the user who is seated in the wheelchair for a long time from having chronic diseases such as bedsores and body deformations and avoid the accidents while the user gets into or out of the wheelchair. The care provider can check on the statistics in the server 81 through the user interface 82 (e.g., a computer) or portable device 83 so as to instantly provide necessary services. In an embodiment, the portable device 83 includes a notebook computer, a personal digital assistant (PDA), a smart phone or a pager. In practice, the portable device 83 could be an example of the user interface 82. As to the processing for an urgent warning, the wireless transmission module of the wheelchair data processing unit generates a warning, and the warning is transmitted to both the wireless access point 84 and the portable device 83, so that the care worker within the wireless transmission range can instantly take necessary actions.

The wheelchair care service system is developed according to the demand of the wheelchair user of institute type; the automatic brake, the detection of the user's posture, the estimation of the user's intention, the data transmission network, the care service server and the display for the care provider are used for resolving the imperative problems of the wheelchair care service system such as how to reduce accidents, the bone deformation due to being seated in the wheelchair for long periods and the task load of the care provider.

The above-described embodiments of the present invention are intended to be illustrative only. Numerous alternative embodiments may be devised by those skilled in the art without departing from the scope of the following claims.

What is claimed is:

1. A wheelchair, comprising:

a seat;

at least one wheel comprising a brake, the brake being configured to stop the wheel; and a seat weight sensing mechanism disposed below the seat and connected to the brake, wherein the brake stops the wheel when the seat is not loaded over a predetermined weight, and the seat weight sensing mechanism releases the brake to free the wheel when the seat is loaded over a predetermined weight, wherein the seat weight sensing mechanism comprises two cables, each of the cables connects a tugging member and a secure point through a pulley, the tugging member and the secure point are placed at a first side of the seat, and the pulley is placed at a second side of the seat.

2. The wheelchair in accordance with claim 1, wherein the tugging member connected to the brake and the seat weight sensing mechanism, wherein the seat weight sensing mechanism tugs the tugging member, and the tugging member releases the brake to free the wheelchair when the seat is loaded over a predetermined weight.

3. The wheelchair in accordance with claim 2, wherein the tugging member comprises a coil spring, and the wheel is released by counteracting an elastic force of the coil spring when the seat is loaded over the predetermined weight.

4. The wheelchair in accordance with claim 2, wherein the tugging member and the brake are connected by a cable.

5. The wheelchair in accordance with claim 2, further comprising a manual brake release device connected to the tugging member, wherein the manual brake release device tugs the tugging member, and the tugging member releases the brake to free the wheelchair when a user enables the manual brake release device.

6. The wheelchair in accordance with claim 2, wherein the tugging member is a roller or a concentric torque member.

7. The wheelchair in accordance with claim 1, wherein the seat weight sensing mechanism comprises cables, straps, net-like fabric or leather.

* * * * *